United States Patent
Collinge et al.

(10) Patent No.: US 10,504,116 B2
(45) Date of Patent: Dec. 10, 2019

(54) VERIFICATION FOR PAYMENT TRANSACTIONS

(71) Applicant: MasterCard International Incorporated, Purchase, NY (US)

(72) Inventors: Mehdi Collinge, Mont-Sainte-Aldegonde (BE); Patrik Smets, Nijlen (BE)

(73) Assignee: Mastercard International Incorporated, Purchase, NY (US)

( * ) Notice: Subject to any disclaimer, the term of this patent is extended or adjusted under 35 U.S.C. 154(b) by 190 days.

(21) Appl. No.: 15/267,349

(22) Filed: Sep. 16, 2016

(65) Prior Publication Data
US 2017/0083915 A1 Mar. 23, 2017

(30) Foreign Application Priority Data
Sep. 18, 2015 (GB) .................................. 1516617.6

(51) Int. Cl.
*G06Q 40/00* (2012.01)
*G06Q 20/40* (2012.01)
(Continued)

(52) U.S. Cl.
CPC ......... *G06Q 20/4014* (2013.01); *G06Q 20/32* (2013.01); *G06Q 20/327* (2013.01); *G06Q 20/3224* (2013.01); *G06Q 20/3227* (2013.01); *G06Q 20/36* (2013.01); *G06Q 20/3674* (2013.01); *G06Q 20/382* (2013.01); *G06Q 20/40* (2013.01); *G06Q 20/401* (2013.01); *G06Q 20/409* (2013.01); *G06Q 20/4016* (2013.01)

(58) Field of Classification Search
CPC ............ G06Q 20/3829; G06Q 20/322; G06Q 20/327; G06Q 20/3821; G06Q 20/4014; G06Q 20/3674; G06Q 20/409
See application file for complete search history.

(56) References Cited

U.S. PATENT DOCUMENTS 7,801,825 B2 * 9/2010 Kranzley ............... G06Q 20/02
380/281
9,355,393 B2 * 5/2016 Purves ................. G06Q 20/105
(Continued)

FOREIGN PATENT DOCUMENTS

AU 2011239307 A1 * 11/2011
GB 2522929 A 8/2015

OTHER PUBLICATIONS

Ram Pratap Sharma and Gyanendra K. Verma, "Human Computer Interaction using Hand Gesture," Elsevier, Procedia Computer Science, (Year: 2015).*
(Continued)

*Primary Examiner* — Alexander G Kalinowski
*Assistant Examiner* — William B. Bunker
(74) *Attorney, Agent, or Firm* — Buckley, Maschoff & Talwalkar LLC

(57) ABSTRACT

A method is described for providing user authentication and user consent for a transaction made with a payment device. A user authentication step is taken to verify that a user is entitled to use the payment device, and a user consent step is taken to verify that the user consents to the transaction. The user authentication step is discrete from the user consent step. A payment device adapted to perform this method is also described.

13 Claims, 8 Drawing Sheets

(51) Int. Cl.
*G06Q 20/36* (2012.01)
*G06Q 20/32* (2012.01)
*G06Q 20/38* (2012.01)

(56) References Cited

U.S. PATENT DOCUMENTS

| | | | | |
|---|---|---|---|---|
| 10,185,958 B2* | 1/2019 | Henderson | ......... | G06Q 20/3224 |
| 2011/0112920 A1* | 5/2011 | Mestre | ................... | G06Q 20/20 |
| | | | | 705/17 |
| 2013/0197998 A1* | 8/2013 | Buhrmann | ......... | G06Q 30/0255 |
| | | | | 705/14.53 |
| 2013/0227651 A1* | 8/2013 | Schultz | ................... | G06F 21/32 |
| | | | | 726/4 |
| 2014/0101036 A1* | 4/2014 | Phillips | ................ | G06Q 20/027 |
| | | | | 705/39 |
| 2014/0156531 A1* | 6/2014 | Poon | .................. | G06Q 20/4016 |
| | | | | 705/44 |
| 2014/0250016 A1* | 9/2014 | Kranzley | ........... | G06Q 20/4016 |
| | | | | 705/44 |
| 2014/0289822 A1* | 9/2014 | Wilson | ................... | G06Q 20/42 |
| | | | | 726/5 |
| 2015/0178724 A1 | 6/2015 | Ngo et al. | | |
| 2015/0186864 A1* | 7/2015 | Jones | ................... | G06Q 20/322 |
| | | | | 705/39 |
| 2015/0339664 A1* | 11/2015 | Wong | .................... | H04L 9/3234 |
| | | | | 705/71 |

OTHER PUBLICATIONS

Anonymous, "How EMV Credit Card Technology Provides Increased Security," level 10, www.level10.com (Year: 2015).*
Wikipedia, "Apple Pay," (2013) (Year: 2013).*
PCT Search Report and Written Opinion for PCT/US2016/051880 dated Nov. 7, 2016, 12 pages.

* cited by examiner

VERIFICATION FOR PAYMENT TRANSACTIONS

CROSS-REFERENCE TO RELATED APPLICATION

This application is a U.S. National Stage filing under 35 U.S.C. § 119, based on and claiming benefits of and priority to GB Provisional Patent Application No. 1516617.6 filed Sep. 18, 2015.

TECHNICAL FIELD

The present disclosure relates to verification for payment transactions and particularly for verification associated with the use of payment devices.

BACKGROUND

In payment transactions using a payment device (e.g. a contact integrated circuit card, a contactless integrated circuit card or a mobile device with a digital wallet), authorisation and consent are used to secure payment transactions. Authorisation ensures that a payment device is permitted to perform a payment transaction, and this is typically carried out by checking with an issuer of a payment device. For example, authorisation may be revoked by the issuer if the payment device is reported as lost or stolen by a user.

Consent ensures that a user of a payment device agrees to the payment device being used in a particular payment transaction. For example, in a 'chip-and-PIN' payment transaction using an integrated circuit card as the payment device, as the user of the payment device verifies their identity by providing their PIN on a Point of Interaction (POI, e.g. a payment transaction terminal) once the payment device is connected to the POI, consent from the user is implied.

The combination of authorisation and consent means that a fraudulent user cannot perform contactless pick-pocketing, eavesdropping attacks or perform two consecutive transactions while the user of the payment device only intended to perform one. FIG. 1 illustrates contactless pick-pocketing wherein a fraudulent user 10 having a dummy POI is in close proximity to a user 12 having a contactless payment device 14.

Typically, contactless payment transaction employ an upper limit to the value of the payment transaction is imposed unless a Cardholder Verification Method (CVM) is used. This provides speed and convenience to users as they do not have to undertake a verification method.

Consumer Device Cardholder Verification Methods (CD-CVMs) are increasingly being used for payment devices comprising a mobile device with a digital wallet. The use of CDCVMs generally allows the value of a payment transaction to be increased due to the security provided by verification. CDCVMs involve a user of the payment device verifying their identity on the payment device itself. During a payment transaction using CDCVM, no additional customer action is required on the POI or paper receipt to verify the customer, such as a signature or PIN. For example, the mobile device may be arranged to receive a PIN and/or comprise a biometric sensor for verifying the identity of a user. The payment device can then be used with a POI to undertake a payment transaction.

It is an aim of the present disclosure to address disadvantages associated with the prior art.

SUMMARY

In one aspect, the disclosure provides a method for providing user authentication and user consent for a transaction made with a payment device, comprising a user authentication step to verify that a user is entitled to use the payment device and a user consent step to verify that the user consents to the transaction, wherein the user authentication step is discrete from the user consent step. The user authentication step may comprise a consumer device cardholder verification method (CDCVM). This user authentication step may be taken outside a transaction context, but may persist into a transaction context. The user consent step may be an explicit user consent made within a transaction process. The user consent may in embodiments be an implicit user consent inferred from user or device actions or user or device context. In another aspect, apparatus adapted to perform the methods described above are also provided.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

FIG. 1 has already been described above by way of background, in which:

FIG. 1 is a schematic representation of contactless pick-pocketing.

Figure 1:
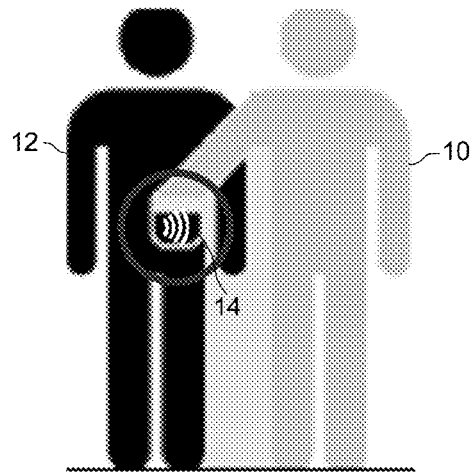
Figure 2:
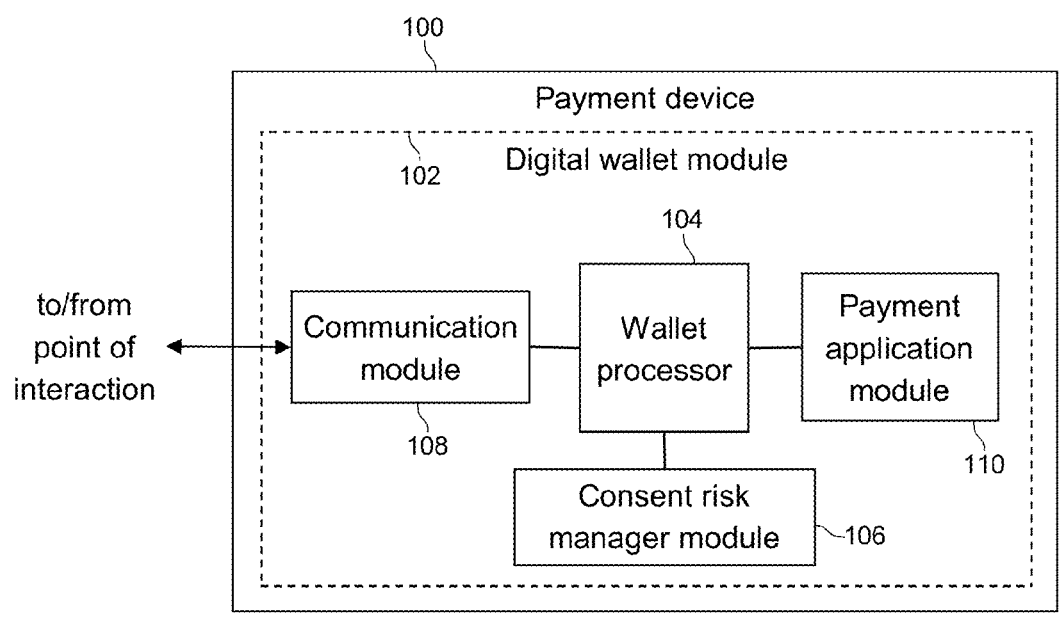
Figure 3:
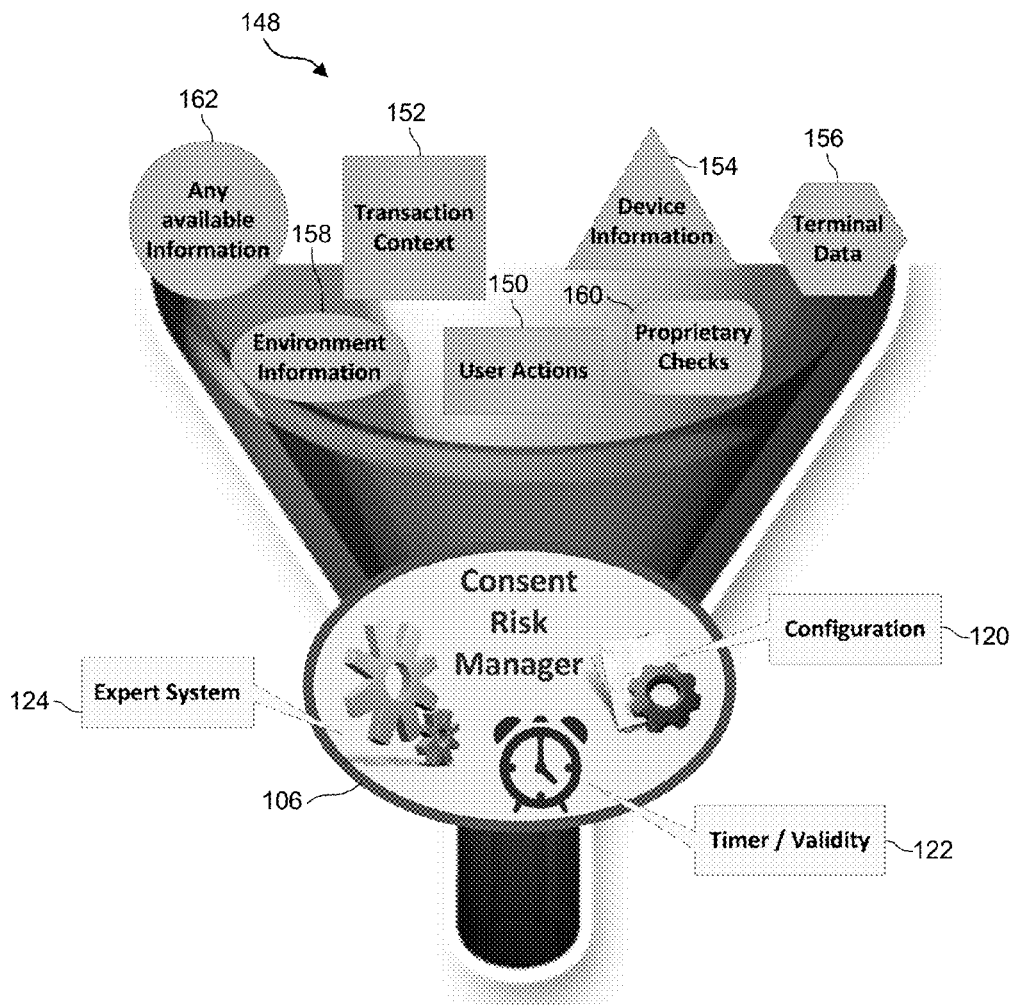
Figure 4:
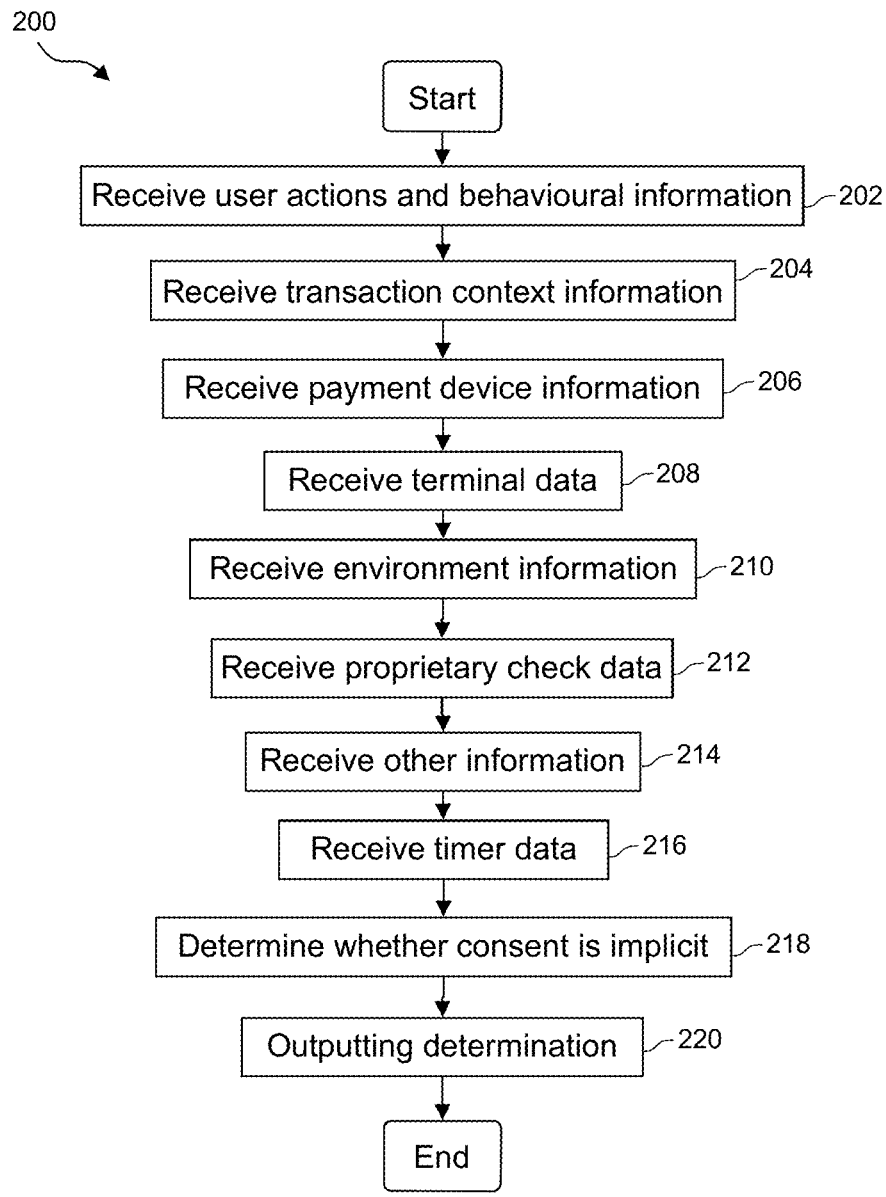
Figure 5:
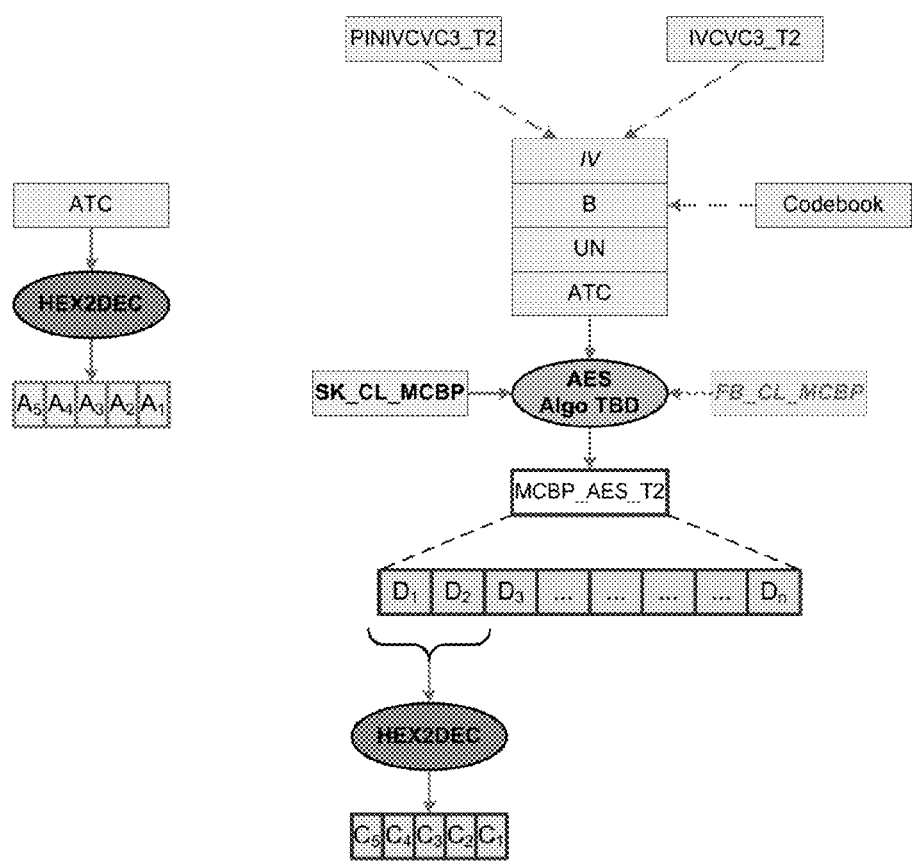
Figure 6:
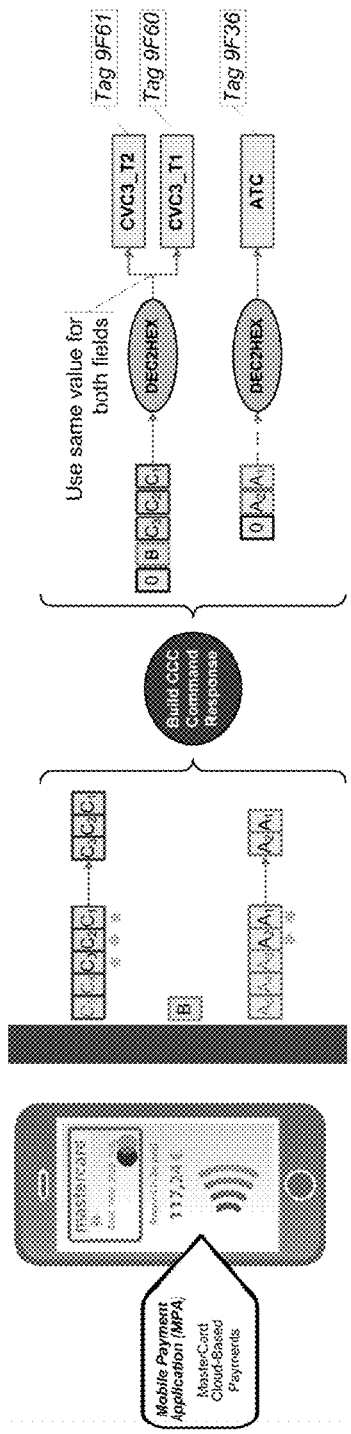
Figure 7:
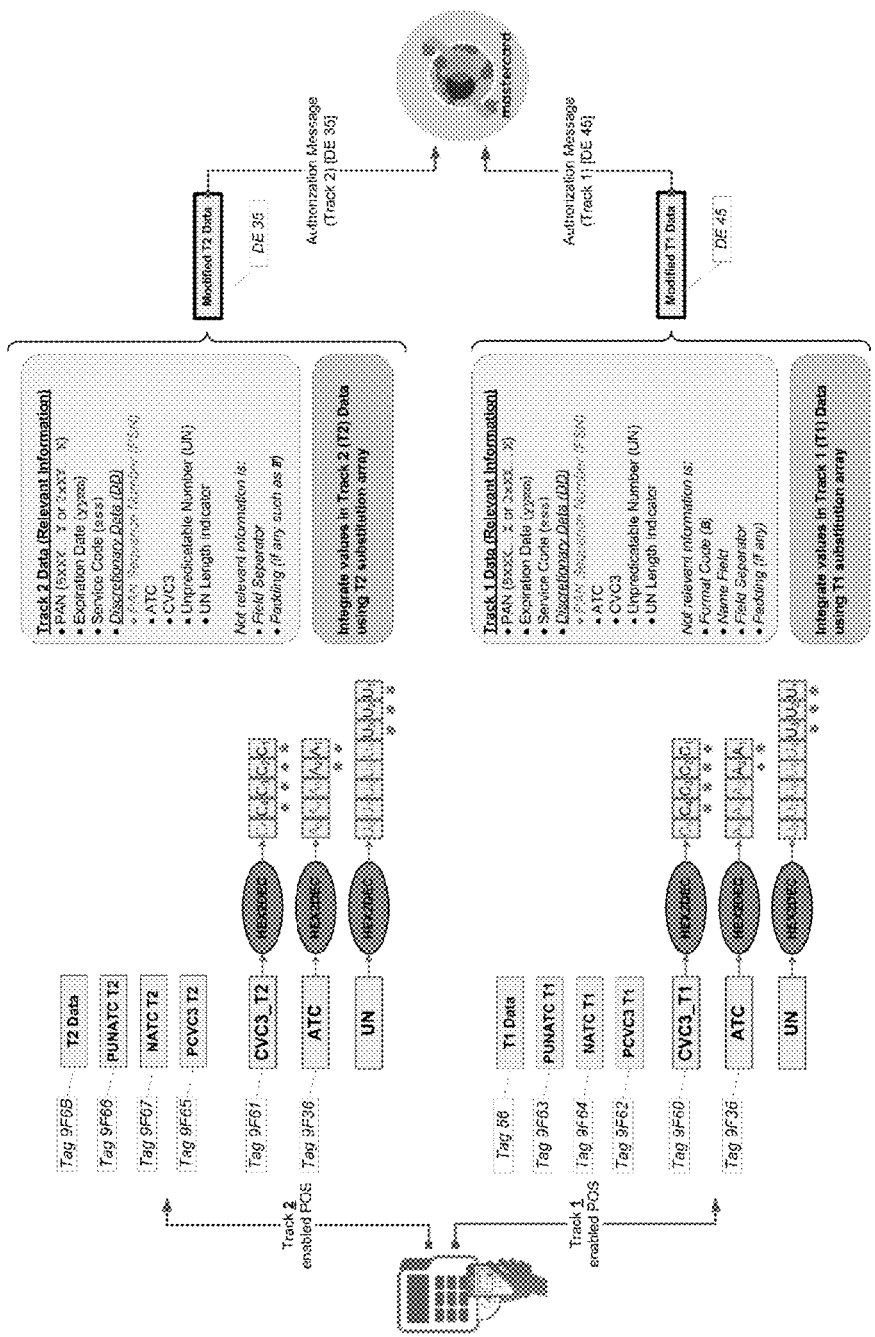
Figure 8:
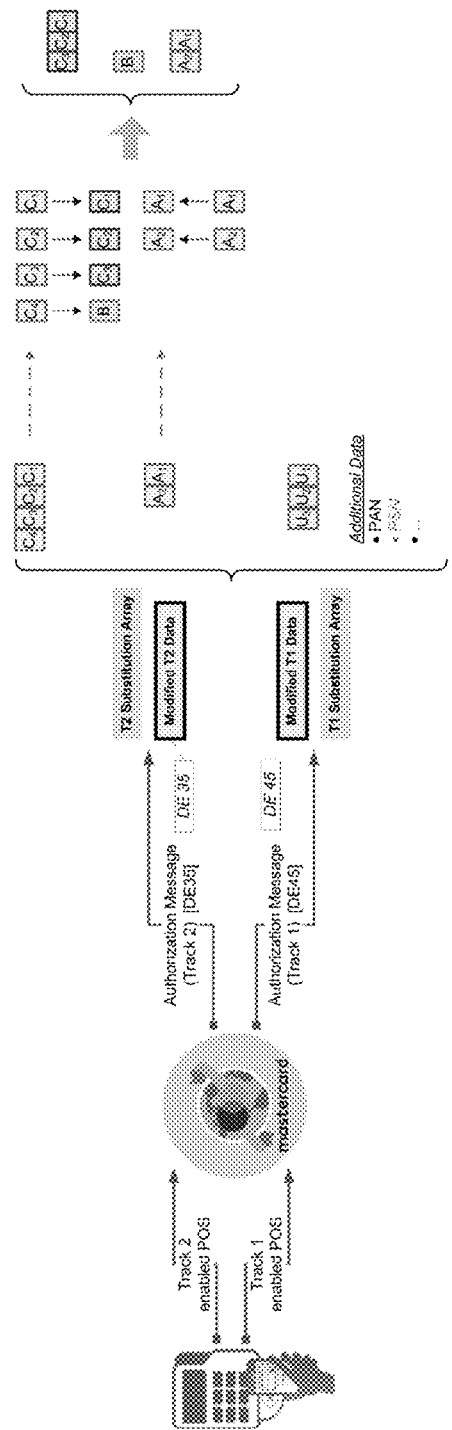
Figure 9:
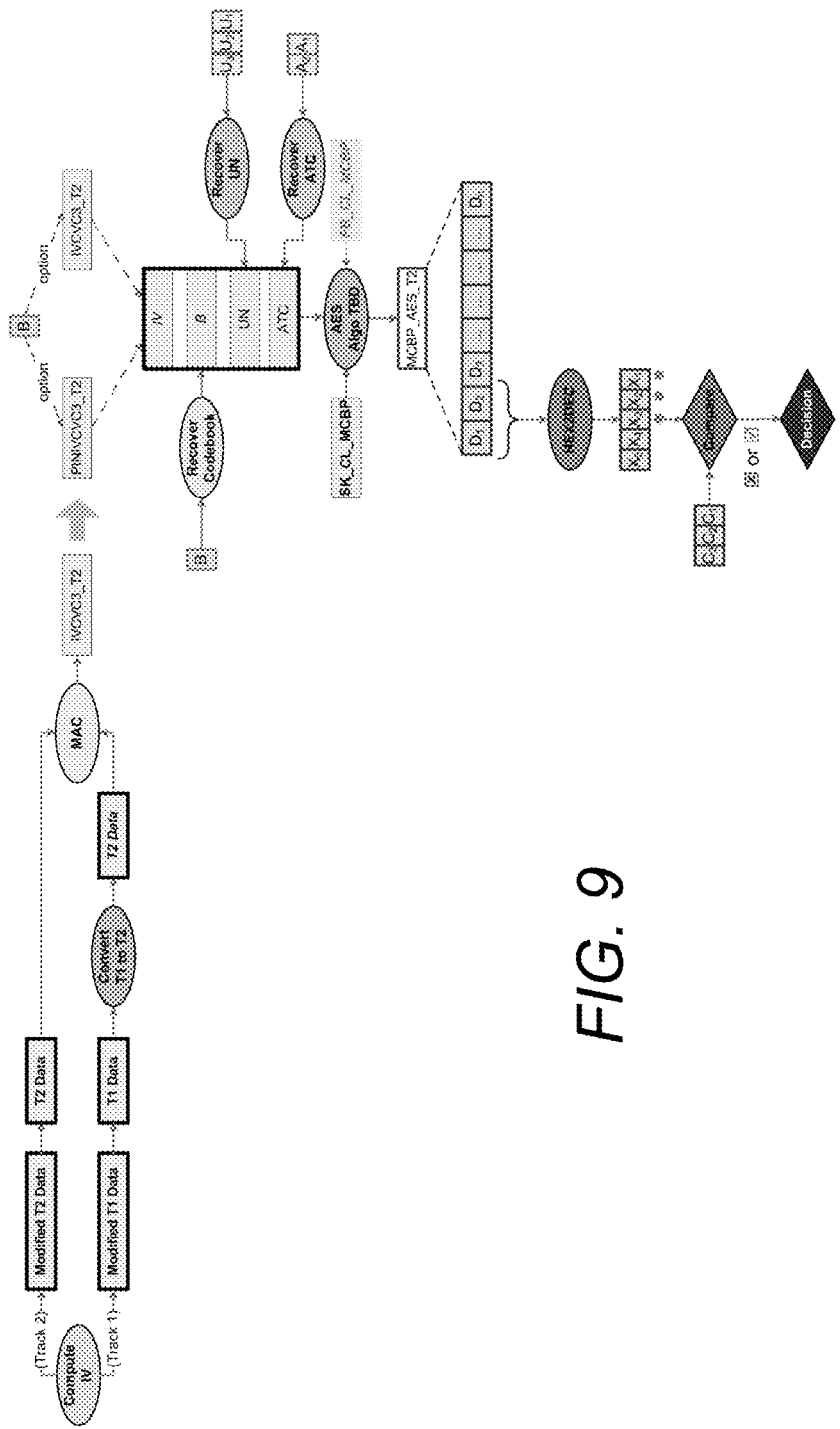

One or more embodiments of the disclosure will now be described in detail by way of example only, with reference to the remaining drawings, in which:

FIG. 2 is a schematic block diagram of a payment device according to an embodiment of the present disclosure;

FIG. 3 is a schematic diagram of a consent risk manager module according to an embodiment of the present disclosure;

FIG. 4 is a flowchart of a process according to an embodiment of the present disclosure;

FIG. 5 shows the generation of a cryptogram in a mobile payment application for a contactless Mag Stripe embodiment;

FIG. 6 shows a process used by a Mobile Payment Application to convert information to be carried using CVC3 and ATC as container for the embodiment of FIG. 5;

FIG. 7 shows a process used by a POS terminal to integrate an Unpredictable Number and the information generated in FIG. 6 into Track Data;

FIG. 8 shows a process used by the transaction management system to extract data carried using the Track Data for the embodiment of FIG. 5; and FIG. 9 shows a process used by the transaction management system to validate the cryptogram generated by the Mobile Payment Application for the embodiment of FIG. 5.

DETAILED DESCRIPTION

CDCVM schemes for contactless payment transactions may involve Instant CDCVM, Prolonged CDCVM or Persistent CDCVM. Instant CDCVM is verification that occurs in the context of a specific payment transaction.

Prolonged CDCVM is a verification mechanism carried out in a context different from a payment transaction, and may precede the actual payment transaction. For example, if the payment device uses a passcode to unlock other functionality such as email access, a user verification performed at the time of accessing emails on the payment device may be re-used (within a predetermined time limit) to deliver verification as part of a payment transaction without requiring the user to provide verification again.

Persistent CDCVM involves an initial user verification on the payment device, after which the payment device can be used in subsequent payment transactions without requiring specific user verification for each transaction. Typically, a payment device used for Persistent CDCVM maintains the verification status until a change occurs to the payment device. For example a smart watch monitoring the pulse of a user can be used to keep a CVM persistent after a first verification. In the event that the smart watch is removed from the user, the verification ceases to be valid until another successful verification is performed.

The Consent is defined as any action or series of events indicating that the person holding the device agrees to the payment transaction. Consent can be expressed explicitly through an action performed within context of a payment transaction or implicitly by a series of events and actions performed prior to or during the payment transaction. In case of the latter, it is the combination and the sequence of events and actions that indicates Consent (rather than each event or action on its own) as such sequence or combination is very unlikely to happen if the user were not to consent to the transaction When using an Instant CDCVM for user verification, Consent is automatically performed (i.e. explicitly given) as the user has to interact with the payment device or with a payment consumer device to capture authentication and consent.

Currently, explicit Consent must be given from a user in the form of CDCVM when using a digital wallet on a mobile device as a payment device. Explicit Consent relies on one-for-all validation mechanisms such as pressing a button, providing the value of a secret, or making a gesture (such as screen unlock). A disadvantage of explicit Consent is that it requires a payment application to be open before validation mechanisms can be entered.

In some cases, payment applications are opened at the time that the transaction is performed—for instance by tapping the phone on the terminal. If then the user has to push a button or make a gesture before the transaction can complete, it means that the transaction in progress would need to be interrupted to let the user provide the explicit Consent before continuing the transaction—resulting in a two tap scenario, with the explicit Consent given between the first tap and the second tap when performing a contactless transaction.

As result of the technical constraints of the acceptance environment (for example when using a point of sale terminal not supporting the concept of dual tap), a merchant will have to restart the transaction after the decline at the first tap. This can be seen as a blocking factor for deployment of mobile payment solutions using explicit Consent for low or high value transactions when prolonged or persistent CDCVM is used. A similar problem occurs in remote payment processes, for example cloud-based payments.

Embodiments of the present disclosure provide a digital wallet arranged to determine whether a user has implicitly provided Consent to undertake a payment transaction. The determination is made based on context that may not be directly related to the payment application and correlation of different events, bypassing the need for any additional user action (or interaction) with the digital wallet as would be required for explicit Consent discussed by way of background.

FIG. 2 shows a payment device 100 according to an embodiment of the present disclosure. In this embodiment, the payment device 100 is a smartphone. The payment device 100 comprises a digital wallet module 102. The digital wallet module 102 comprises a wallet processor 104, a consent risk manager module 106, a communication module 108 and a payment application module 110. The consent risk manager module 106, the communication module 108 and the payment application module 110 are each operatively connected to the wallet processor 104.

The consent risk manager module 106 is arranged to determine whether or not implicit consent of a user is given to undertake a payment transaction, as described below in greater detail with reference to FIG. 3. The communication module 108 is arranged to communicate data to and from POIs during a payment transactions. In this embodiment, the communication module 108 comprises a near field communication device to communicate with POIs. The payment application module 110 comprises a secure element with one or more payment applications for processing payment transaction data during payment transactions.

The digital wallet module 102 makes use of available information from the user behaviour and their interaction with the payment device 100 or from the payment device 100 itself, for example by creating a specific order of events, in order to determine that the user has explicitly performed an action that is consistent with the intent to pay prior to the actual payment. If this action provides sufficient evidence to assume consent, then it is rated as a satisfactory condition to report that consent was provided to a payment application in the payment application module 110, avoiding the need for the payment application to seek explicit consent from the user.

FIG. 3 shows the consent risk manager module 106 in greater detail. The consent risk manager module 106 comprises a configuration module 120, a timer 122 and a decision module 124 (labelled in FIG. 3 as 'expert system'). The configuration module 120 comprises instructions for how to process the inputs to the consent risk manager module 106. The timer 122 is arranged to provide trusted time information in order to support validity checks. The decision module 124 is arranged to process the inputs to the consent risk manager module 106 and determine whether implicit consent is being provided.

The decision module 124 is arranged to process input information 148 available from the payment device 100 including:
  User actions and behavioural information 150;
  Transaction context information 152;
  Payment device information 154;
  Terminal data 156;
  Environment information 158;
  Proprietary check data 160; and
  Other information 162.

User actions and behavioural information 150 comprises one or more of:
  Providing consent prior to the start of the transaction;
  Accessing the digital wallet module 102 (e.g. if it was closed before);

Selecting a payment application from the payment application module 110 (if the digital wallet module 102 is already being accessed);

If the payment device is a clamshell phone, opening the clamshell phone and enabling the NFC interface by doing so;

Detecting movement (e.g. through a gyroscope on the payment device 100) consistent with a tap; and Detecting daylight (e.g. if previously it was dark because the payment device 100 was in a pocket/handbag).

Transaction context information 152 is information associated with a payment transaction for which implicit Consent is being determined by the consent risk manager module 106.

Payment device information 154 comprises one or more of:

Information associated with a near field communication event using the payment device 100;

Localization information of the payment device 100 against information about a merchant initiating a payment transaction (such as when using a merchant branded digital wallet in one of the stores/malls of that brand). This may require a check against a known list of data or an online check against a database or validation service;

An SSID (Wi-Fi Access point) when shopping in a store (in that case the implicit consent would be driven by business rules where the merchant would favour the speed of the transaction at the cashier desk);

Detecting recent use of a camera on the payment device 100 to scan a QR Code (when QR is used to trigger remote payment process);

Detection of screen pointed to a user's face (or eyes) when performing a remote payment. This may not necessarily involve facial recognition (as biometric verification is covered by authentication using CDCVM) but the fact that for remote payment, some level of user interaction is expected during shopping and check-out process with a user able to see/read information displayed on the screen of the payment device 100 used in the payment transaction; and When an "in-app purchase" within a mobile application on the payment device 100 is used to trigger a remote payment, checking if the mobile application is actually installed and running on the payment device 100 used to perform the payment transaction. The check can be extended to a legitimate companion device (such as smart watch, wristband . . . ) which can be considered as trusted and authorized to transact.

Terminal data 156 comprises one or more of:

Detecting a specific merchant category code (e.g. codes used for transportation networks), optionally with the detection of special transaction amount (such as zero value transaction) in order to detect a special transaction where implicit consent would be the rule according to some business decisions;

If transactions are performed consecutively, transaction details (such as amount) are the same; and Detecting a type of transaction (merchant, amount . . . ) that is performed by the user on a regular and consistent basis (such as pay 1 EUR every week day in the morning to buy a newspaper or a croissant). In that base the recurrent behaviour of the user (i.e. user habits) is translated as an implicit consent.

Environment information 158 comprises one or more of:

Detection of compliant timeframe between the time reported by the timer 122 of the payment device 100 (or a query to a trusted online clock service) against the opening hours reported for the store of that merchant;

Evaluate the spot speed and altitude of the payment device 100 to assess whether it is compliant with the acceptance environment and location as reported in the transaction data and localization information (for example transacting at 70 mph in a physical store would be rated as abnormal while transacting at 500 mph at 10.000 feet would be an in-flight transaction); and Match merchant name used for payment transaction with the last used web pages or in-app used on the mobile device or legitimate companion device (such as smart watch, wristband . . . ) to trigger the remote payment process.

Proprietary check data 160 includes information determined from the outcome of proprietary checks. For example, proprietary checks may be defined to answer some specific needs linked with the delivery of a digital wallet associated with a given merchant brand (such as digital wallet from shop ABC/retailer XYZ).

FIG. 4 shows a process 200 of determining whether implicit Consent is given according to an embodiment of the present disclosure. The process 200 is carried out by the decision module 124 and comprises:

Step 202—receiving user actions and behavioural information 150;

Step 204—receiving transaction context information 152;

Step 206—receiving payment device information 154;

Step 208—receiving terminal data 156;

Step 210—receiving environment information 158;

Step 212—receiving proprietary check data 160;

Step 214—receiving other information 162;

Step 216—receiving time information from the timer 122;

Step 218—determining whether consent is implicit based on the received data from Steps 202 to 216 using the instructions in the configuration module 120; and Step 220—outputting the determination from Step 218 to the payment application module 110 for it to carry out a payment transaction.

When the decision module 124 outputs that implicit Consent is granted, then the payment transaction can be completed without an additional interaction from the user (this is separate to the conditions of authentication being satisfied). In the event that implicit Consent cannot be granted by the decision module 124, explicit Consent would be obtained using CDCVM on the payment device 100.

CDCVM data is used to carry information about user consent and user authentication to the Issuer Authorization System (or Transaction Management System). CDCVM applies both to remote and contactless Payments. CDCVM data is carried using two bytes (Byte1 or B1, Byte 2 or B2) in a contactless EMV solution (EMV specifications may be found at emvco.com/specifications.aspx) and for Digital Secure Remote Payment (DSRP). This CDCVM data may also be used for generation of the cryptogram in EMV transaction protocols. An exemplary composition of CDCVM data is described in detail below, as is also a Mag Stripe based solution. For a Mag Stripe solution there is only one digit available for CDCVM data so a codebook solution is used—this is also described in detail below.

In the CDCVM data according to embodiments of the disclosure, not only the nature of the CVM and the existence (and nature) of consent is provided, but also the strengths of the CDCVM method, of the control on prolonged or persistent consent, and of the consent method. These strengths may be rated by the transaction scheme provider or by the card issuer.

CDCVM data according to this approach may be considered to have three layers: CDCVM method, CDCVM quality and CDCVM integrity. Methods may include PIN, password, pattern, biometrics (fingerprint, iris, face) or combinations of methods (typically "something you are" and "something you know"). Quality may relate to number of digits of a PIN, number of characters of a password (and requirements for character types), number of dots or complexity of a pattern and false acceptance rate of a biometric.

In considering integrity, both the component C used to capture the CDCVM and the component A being the application using the outcome of CDCVM validation need to be considered. Of significance here is whether a Trusted User Input is employed to provide a cryptographic security mechanism to assure the validity of the process—this needs to be supported by the operating system of the device.

The embodiments described here identify ratings as undefined, weak, medium or strong, but do not provide a specific mapping of values for the qualities discussed above on to ratings—this will typically be determined by a card issuer according to the card issuer's own security model. This applies to the CDCVM method, and also applies to the control of Prolonged or Persistent CDCVM.

CDCVM may not always be required for a low value transaction (LVT)—for example, when a card-like model is used for the payment application on the device. Consent is used to ensure that the holder of the device agrees to the current transaction.

In the absence of Prolonged CDCVM and Persistent CDCVM, data collected from the card by a fraudster could only qualify for Low Value Transactions—unless the fraudster can persuade the user to authenticate using instant CDCVM. However, if the payment application is using a Prolonged CDCVM or a Persistent CDCVM, data collected fraudulently could be used for High Value Transactions as well. In that case the Consent is the gatekeeper to ensure that the holder of the device agrees to a high value transaction.

As noted above, Consent may be explicit or implicit (for example, contextually derived)—this should be communicated with the CDCVM. It is possible to improve the quality of the information with the delivery of a rating of the consent. That way without delivering proprietary information about the methods used to deliver the implicit consent, it would be possible for the Issuer to qualify the transaction. Consequently it is desirable also to give a rating for the consent. It is also desirable to determine and convey whether the CDCVM was captured on the same device as used to provide the consent.

Explicit Consent is the standard approach to provision of consent. Such approaches rely on a standard mechanism such as pressing a button, providing the value of a secret (essentially an authentication) or making a gesture (such as screen unlock). Any of these mechanisms are captured and processed by the payment application. They are applied systematically and they do not rely on additional context information—for instance the fact that the user opened their wallet and selected a card within the last few seconds.

The basic idea of implicit Consent is to let the wallet on the payment device determine that the Consent was actually provided based on context that may not be directly related to the payment application and correlation of different events, bypassing the need for an additional user action that needs to be entered in the wallet application. This may be achieved by a Consent Risk Manager, as described above and illustrated in FIG. 3. Generally, the wallet may leverage from available information from the user behavior and their interaction with the device or from the device itself—creating a specific order of events—in order to determine that the user has explicitly performed an action that is consistent with the intent to pay prior to the actual payment. If this action provides sufficient evidence to assume consent, then it is rated as a satisfactory condition to report that consent was provided to the payment application, avoiding the need for the payment application to ask the user to perform an additional action.

Preferably, CDCVM and Consent information using a defined set of codes and values that are agnostic of the technology used to obtain the CDCVM and Consent information. An exemplary approach is set out in more detail below. In using a Wallet on a device to provide such information, it is preferable for this information to be secured, such as by inclusion in the cryptogram used in the transaction process (AC for an EMV based solution, CVC3 for a Mag Stripe based solution).

Where such information is carried as part of the transaction, the following principles may be employed:
　CDCVM and Consent information can be combined as CDCVM Data;
　in EMV, a 2-byte field may be used to carry the CDCVM Data and used to generate the cryptogram (AC); and
　in Mag Stripe, with significantly greater constraints and issues with processing of Track 1 and Track 2 data, one digit of the track data is used to carry a subset of the CDCVM Data encoded using a CDCVM Codebook—the relevant value from the codebook is used in generating the cryptogram CVC3.

EMV and Mag Stripe solutions will now be described in more detail.

In the EMV solution, the following information can be carried.
　CDCVM information:
　　TUI Information
　　　Was TUI used? (unknown/yes/no)—Note that TUI can be TEE-based or using another method like SE-based
　　　Does the OS support TUI? (yes/no)
　　What is the CDCVM method used? (identifier of the method—including no CDCVM case)
　　What is the rating of the CDCVM method? (no rating defined/strong/medium/weak)
　　What is the type of CDCVM? (unknown/instant/prolonged/persistent)
　　What is the rating of the control on Prolonged/Persistent CDCVM? (no rating defined/strong/medium/weak)
　Consent Information:
　　What is the type of Consent? (explicit/implicit)
　　What is the rating of the Consent method? (no rating defined/strong/medium/weak)

In working according to EMV specifications, field DE55 or DE48 could be used—in using DE55, for example, the CDCVM data could be added to the Issuer Application Data (IAD) in carrying information as part of the transaction data.

The CDCVM data is a 2-byte field. The first byte may be represented as shown in Table 1 below, whereas the second byte may be provided as shown in Table 2. Note that these tables also contain information about the input to be used to determine the value of the CDCVM Codebook described in detail below in relation to the Mag Stripe based solution.

TABLE 1

| b8 | b7 | b6 | b5 | b4 | b3 | b2 | b1 | | Codebook (Mag Stripe) | |
|---|---|---|---|---|---|---|---|---|---|---|
| | | | | | | | | CDCVM Data Byte 1 | | |
| x | X | | | | | | | Trusted User Input (TUI) Information [TUI can be TEE-based or using another method like SE-based] | TUI used? | TUI used? |
| 0 | 0 | | | | | | | Unknown use of TUI | Unknown | Unknown |
| 0 | 1 | | | | | | | CDCVM but TUI not supported by the environment (and therefore not used) | No | No |
| 1 | 0 | | | | | | | CDCVM but TUI supported by the environment was not used | No | |
| 1 | 1 | | | | | | | CDCVM with TUI | Yes | Yes |
| | | x | x | | | | | What is the rating of the CDCVM Method? | | |
| | | 0 | 0 | | | | | No rating defined | | |
| | | 0 | 1 | | | | | Weak | | |
| | | 1 | 0 | | | | | Medium | | |
| | | 1 | 1 | | | | | Strong | | |
| | | | | x | x | | | What is the type of CDCVM? | | CDCVM Type |
| | | | | 0 | 0 | | | Unknown CDCVM type | | Unknown |
| | | | | 0 | 1 | | | Persistent | | Prolonged or Persistent |
| | | | | 1 | 0 | | | Prolonged | | |
| | | | | 1 | 1 | | | Instant | | Instant |
| | | | | | | x | x | What is the rating of the control on Prolonged/Persistent CDCVM? | | |
| | | | | | | 0 | 0 | No rating defined | | |
| | | | | | | 0 | 1 | Weak | | |
| | | | | | | 1 | 0 | Medium | | |
| | | | | | | 1 | 1 | Strong | | |
| | | | | | | | | CDCVM Data Byte 2 | | |
| x | | | | | | | | What is the type of Consent? | | Consent Type |
| 0 | | | | | | | | Implicit | | Implicit |
| 1 | | | | | | | | Explicit | | Explicit |
| | x | x | | | | | | What is the rating of the Consent Method? | | |
| | 0 | 0 | | | | | | No rating defined | | |
| | 0 | 1 | | | | | | Weak | | |
| | 1 | 0 | | | | | | Medium | | |
| | 1 | 1 | | | | | | Strong | | |
| | | | x | | | | | Error! Reference source not found. | | |
| | | | 0 | | | | | Different devices | | |
| | | | 1 | | | | | Same device | | |
| | | | | x | x | x | x | CDCVM Method (unique number assigned in scheme) | Biometric? | CDCVM Method |
| | | | | 0 | 0 | 0 | 0 | No CDCVM | N/A | N/A |
| | | | | 0 | 0 | 0 | 1 | Face | Yes | Biometric Any |
| | | | | 0 | 0 | 1 | 0 | Fingerprint | Yes | Biometric |
| | | | | 0 | 0 | 1 | 1 | Iris | Yes | Biometric |
| | | | | 0 | 1 | 0 | 0 | Multi factor authentication (such as something you are and something you know) | Yes | Biometric |
| | | | | 0 | 1 | 0 | 1 | Password | No | Non-biometric |
| | | | | 0 | 1 | 1 | 0 | Pattern | No | Non-biometric |
| | | | | 0 | 1 | 1 | 1 | PIN | No | Non-biometric |
| | | | | 1 | 0 | 0 | 0 | RFU | — | — |
| | | | | 1 | 0 | 0 | 1 | RFU | — | — |
| | | | | 1 | 0 | 1 | 0 | RFU | — | — |
| | | | | 1 | 0 | 1 | 1 | RFU | — | — |
| | | | | 1 | 1 | 0 | 0 | RFU | — | — |
| | | | | 1 | 1 | 0 | 1 | RFU | — | — |
| | | | | 1 | 1 | 1 | 0 | RFU | — | — |
| | | | | 1 | 1 | 1 | 1 | Windows (Hello) | Yes | Biometric |

The value of CDCVM B2 b5 may be set by the Wallet according to the use cases set out below in Table 3.

TABLE 3

Consent and CDCVM Use Cases

| Use Case | Description | Setting of Capture information |
|---|---|---|
| UC01 | No CDCVM, Consent performed on device A and device A used to perform transaction | Same device |
| UC02 | No CDCVM, Consent performed on device B and device A used to perform transaction | Different devices |
| UC03 | CDCVM performed on device A, Consent performed on device A and device A used to perform transaction | Same device |
| UC04 | CDCVM performed on device A, Consent performed on device A and device B used to perform transaction Device B must know or have access to CDCVM information and Consent information from device A in order to use them in transaction data | Different devices |
| UC05 | CDCVM performed on device A, Consent performed on device B and device B used to perform transaction Device B must know or have access to CDCVM information from device A in order to use it in transaction data (in addition to Consent information from device B) | Different devices |
| UC06 | CDCVM performed on device A, Consent performed on device B and device A used to perform transaction Device A must know or have access to Consent information from device B in order to use it in transaction data (in addition to CDCVM information from device A) | Different devices |

The Mag Stripe solution will now be described in detail. As the Mag Stripe based solution is much more constrained, it is not possible to carry 2 bytes of information. An approach that can be employed is to assign one digit in the track data and use it to carry one value taken from a codebook of ten values. An exemplary codebook is set out in Table 4 below.

TABLE 4

CDCVM Codebook

| TUI Value | TUI used? | CDCVM Type | Consent Type | CDCVM Method | Description |
|---|---|---|---|---|---|
| 0 | — | — | Explicit or Implicit | N/A | Explicit or Implicit Consent with no CDCVM |
| 1 | TUI and/or CDCVM Type is Unknown | | Explicit or Implicit | Biometric or non-biometric | Explicit or Implicit Consent with unknown use of Trusted User Input (TUI) and/or unknown CDCVM type |
| 2 | No | Prolonged or Persistent | Implicit | Non-biometric | Use Explicit Consent with a Prolonged or Persistent CDCVM that was delivered without a Trusted User Input (TUI) using any non-biometric CDCVM Method (PIN, Password, Pattern . . .) |
| 3 | No | Prolonged or Persistent | Implicit | Biometric | Use Implicit Consent with a Prolonged or Persistent CDCVM that was delivered without a Trusted User Input (TUI) using any biometric CDCVM Method (Fingerprint, Iris, Face . . .) |
| 4 | No | Prolonged or Persistent | Explicit | Biometric or non-biometric | Use Explicit Consent with a Prolonged or Persistent CDCVM that was delivered without a Trusted User Input (TUI) using any CDCVM Method (PIN, Password, Pattern, Fingerprint, Iris, Face . . .) |
| 5 | No | Instant | Explicit | Non-biometric | No use of a Trusted User Input (TUI) to deliver Instant CDCVM (with Explicit Consent) using non-biometric CDCVM Method (PIN, Password, Pattern . . .) |
| 6 | No | Instant | Explicit | Biometric | No use of a Trusted User Input (TUI) to deliver Instant CDCVM (with Explicit Consent) using biometric CDCVM Method (Fingerprint, Iris, Face . . .) |
| 7 | Yes | Prolonged or Persistent | Implicit | Biometric or non-biometric | Use Implicit Consent with a Prolonged or Persistent CDCVM that was delivered with a Trusted User Input (TUI) using any CDCVM Method (PIN, Password, Pattern, Fingerprint, Iris, Face . . .) |
| 8 | Yes | Prolonged or Persistent | Explicit | Biometric or non-biometric | Use Explicit Consent with a Prolonged or Persistent CDCVM that was delivered with a Trusted User Input (TUI) using any CDCVM Method (PIN, Password, Pattern, Fingerprint, Iris, Face . . .) |

TABLE 4-continued

CDCVM Codebook

| TUI Value used? | CDCVM Type | Consent Type | CDCVM Method | Description |
|---|---|---|---|---|
| 9 Yes | Instant | Explicit | Biometric or non-biometric | Use a Trusted User Input (TUI) to deliver Instant CDCVM (with Explicit Consent) using any CDCVM Method (PIN, Password, Pattern, Fingerprint, Iris, Face . . .) |

Using a new subelement to the DE48 field (DE48 SE28), CDCVM Data or CDCVM Codebook information can be delivered as part of the transaction as a series of codes or values agnostic of the technical details required to carry the information. The information can be presented in a readily interpretable format for the user using a series of subfields as below:

Subfield 1—Type of Consent
Subfield 2—Rating of the Consent Method
Subfield 3—Security Level
Subfield 4—CDCVM Method Category
Subfield 5—CDCVM Method
Subfield 6—Type of CDCVM
Subfield 7—Trusted User Input (TUI) Information
Subfield 8—Rating of the CDCVM Method
Subfield 9—Rating of the control on Prolonged/Persistent CDCVM
Subfield 10—Capture of CDCVM and Consent An exemplary format for each subfield is set out below.
Subfield 1—Type of Consent
This is an area in which the information provided by the CDCVM Codebook may be more limited than in an EMV solution. There are three possible values of Type of Consent:
  0—Implicit
  1—Explicit or Implicit
  2—Explicit
A translation table is provided as Table 5 below:

TABLE 5

Type of Consent

| Information in transaction data | Type of Consent | | |
|---|---|---|---|
| | 0 | 1 | 2 |
| CDCVM Data B1 b8 = 0 | ✓ | | |
| CDCVM Data B1 b8 = 1 | | | ✓ |
| CDCVM Codebook = 0 | | ✓ | |
| CDCVM Codebook = 1 | | ✓ | |
| CDCVM Codebook = 2 | ✓ | | |
| CDCVM Codebook = 3 | ✓ | | |
| CDCVM Codebook = 4 | | | ✓ |
| CDCVM Codebook = 5 | | | ✓ |
| CDCVM Codebook = 6 | | | ✓ |
| CDCVM Codebook = 7 | ✓ | | |
| CDCVM Codebook = 8 | | | ✓ |
| CDCVM Codebook = 9 | | | ✓ |

Subfield 2—Rating of Consent Method
This information may not be provided in the CDCVM Codebook solution. There are five possible values for Rating of Consent Method:
  0—No rating defined
  1—No rating provided in transaction data
  2—Weak
  3—Medium
  4—High Table 6 below is a translation table for Rating of Consent Method.

TABLE 6

Rating of Consent Method

| Information in transaction data | Rating of Consent Method | | | | |
|---|---|---|---|---|---|
| | 0 | 1 | 2 | 3 | 4 |
| CDCVM Data B2 b7b6 = 00 | ✓ | | | | |
| CDCVM Data B2 b7b6 = 01 | | | ✓ | | |
| CDCVM Data B2 b7b6 = 10 | | | | ✓ | |
| CDCVM Data B2 b7b6 = 11 | | | | | ✓ |
| CDCVM Codebook = 0 | | ✓ | | | |
| CDCVM Codebook = 1 | | ✓ | | | |
| CDCVM Codebook = 2 | | ✓ | | | |
| CDCVM Codebook = 3 | | ✓ | | | |
| CDCVM Codebook = 4 | | ✓ | | | |
| CDCVM Codebook = 5 | | ✓ | | | |
| CDCVM Codebook = 6 | | ✓ | | | |
| CDCVM Codebook = 7 | | ✓ | | | |
| CDCVM Codebook = 8 | | ✓ | | | |
| CDCVM Codebook = 9 | | ✓ | | | |

Subfield 3—Security Level
This subfield is used to report the security level—integrity—of the CDCVM and Consent information. Three values are possible for this subfield:
  0—Included in cryptogram generation but cryptogram validation failed
  1—Not included in cryptogram generation
  2—Included in cryptogram generation and cryptogram successfully validated Table 7 below is a translation table for Security Level

TABLE 7

Security Level

| Product, Technology and Crypto Validation | | Security Level | | |
|---|---|---|---|---|
| | (if applicable) | 0 | 1 | 2 |
| MCBP 3.0 EMV | Cryptogram validation = Success | | | ✓ |
| | Cryptogram validation = Failure | | ✓ | |
| Mag Stripe | Cryptogram validation = Success | | | ✓ |
| | Cryptogram validation = Failure | | ✓ | |

TABLE 7-continued

| | | Security Level | | | |
|---|---|---|---|---|---|
| Product, Technology and Crypto Validation (if applicable) | | | Security Level | | |
| | | | 0 | 1 | 2 |
| MTBP (TBC) | EMV | Cryptogram validation = Success | | | ✓ |
| | | Cryptogram validation = Failure | | ✓ | |
| | Mag Stripe | (Not included in cryptogram - TBC) | | ✓ | |
| MCM (TBC) | EMV | Cryptogram validation = Success | | | ✓ |
| | | Cryptogram validation = Failure | | ✓ | |
| | Mag Stripe | (Not included in cryptogram - TBC) | | ✓ | |

Subfield 4—CDCVM Method Category

This subfield is relevant both to EMV and Mag Stripe approaches. Four values are possible for this subfield:
0—No CDCVM
1—Non-biometric CDCVM method
2—Any CDCVM method (biometric or non-biometric)
3—Biometric CDCVM method Table 8 below is a translation table for CDCVM Method Category

TABLE 8

| | CDCVM Method Category | | | |
|---|---|---|---|---|
| Information in transaction data | 0 | 1 | 2 | 3 |
| CDCVM Data B2 b4-b1 = 0000 | ✓ | | | |
| CDCVM Data B2 b4-b1 = 0001 | | ✓ | | |
| CDCVM Data B2 b4-b1 = 0010 | | ✓ | | |
| CDCVM Data B2 b4-b1 = 0011 | | ✓ | | |
| CDCVM Data B2 b4-b1 = 0100 | | ✓ | | |
| CDCVM Data B2 b4-b1 = 0101 | | | | ✓ |
| CDCVM Data B2 b4-b1 = 0110 | | | | ✓ |
| CDCVM Data B2 b4-b1 = 0111 | | | | ✓ |
| CDCVM Data B2 b4-b1 = 1000 | | | ✓ | |
| CDCVM Data B2 b4-b1 = 1001 | | | ✓ | |
| CDCVM Data B2 b4-b1 = 1010 | | | ✓ | |
| CDCVM Data B2 b4-b1 = 1011 | | | ✓ | |
| CDCVM Data B2 b4-b1 = 1100 | | | ✓ | |
| CDCVM Data B2 b4-b1 = 1101 | | | ✓ | |
| CDCVM Data B2 b4-b1 = 1110 | | | ✓ | |
| CDCVM Data B2 b4-b1 = 1111 | | | | ✓ |
| CDCVM Codebook = 0 | ✓ | | | |
| CDCVM Codebook = 1 | | ✓ | | |
| CDCVM Codebook = 2 | | | ✓ | |
| CDCVM Codebook = 3 | | | | ✓ |
| CDCVM Codebook = 4 | | | ✓ | |
| CDCVM Codebook = 5 | | ✓ | | |
| CDCVM Codebook = 6 | | | | ✓ |
| CDCVM Codebook = 7 | | | ✓ | |
| CDCVM Codebook = 8 | | | ✓ | |
| CDCVM Codebook = 9 | | | ✓ | |

Subfield 5—CDCVM Method

This subfield is relevant both to EMV and Mag Stripe approaches, but only limited information may be provided in the Mag Stripe approach. The following values may be provided
ANY—Any CDCVM method (biometric or non-biometric)
BIO—Biometric CDCVM method
FAC—Face
FGP—Fingerprint
IRI—Iris
MFA—Multi factor authentication (something you are and something you know)
NBI—Non-biometric CDCVM method
NCD—No CDCVM
PAS—Password
PAT—Pattern
PIN—PIN
RFU—Identifier not yet assigned (Reserved for Future Use)
WHE—Windows (Hello)

Table 9 below is a translation table for CDCVM Method

TABLE 9

| CDCVM Method | |
|---|---|
| Information in transaction data | CDCVM Method |
| CDCVM Data B2 b4-b1 = 0000 | NCD |
| CDCVM Data B2 b4-b1 = 0001 | FAC |
| CDCVM Data B2 b4-b1 = 0010 | FGP |
| CDCVM Data B2 b4-b1 = 0011 | IRI |
| CDCVM Data B2 b4-b1 = 0100 | MFA |
| CDCVM Data B2 b4-b1 = 0101 | PAS |
| CDCVM Data B2 b4-b1 = 0110 | PAT |
| CDCVM Data B2 b4-b1 = 0111 | PIN |
| CDCVM Data B2 b4-b1 = 1000 | RFU |
| CDCVM Data B2 b4-b1 = 1001 | |
| CDCVM Data B2 b4-b1 = 1010 | |
| CDCVM Data B2 b4-b1 = 1011 | |
| CDCVM Data B2 b4-b1 = 1100 | |
| CDCVM Data B2 b4-b1 = 1101 | |
| CDCVM Data B2 b4-b1 = 1110 | |
| CDCVM Data B2 b4-b1 = 1111 | WHE |
| CDCVM Codebook = 0 | NCD |
| CDCVM Codebook = 1 | ANY |
| CDCVM Codebook = 2 | NBI |
| CDCVM Codebook = 3 | BIO |
| CDCVM Codebook = 4 | ANY |
| CDCVM Codebook = 5 | NBI |
| CDCVM Codebook = 6 | BIO |
| CDCVM Codebook = 7 | ANY |
| CDCVM Codebook = 8 | ANY |
| CDCVM Codebook = 9 | ANY |

Subfield 6—Type of CDCVM

This subfield is relevant both to EMV and Mag Stripe approaches, but only limited information may be provided in the Mag Stripe approach. There are six possible values.
0—No CDCVM
1—Unknown
2—Persistent
3—Persistent or Prolonged
4—Prolonged
5—Instant Table 10 below is a translation table for Type of CDCVM

TABLE 10

| | | Type of CDCVM | | | | | |
|---|---|---|---|---|---|---|---|
| Information in transaction data | | 0 | 1 | 2 | 3 | 4 | 5 |
| CDCVM Data B2 b4-b1 = 0000 | | ✓ | | | | | |
| CDCVM Data B2 b4-b1 ≠ 0000 | CDCVM Data B1 b4b3 = 00 | | ✓ | | | | |
| | CDCVM Data B1 b4b3 = 01 | | | ✓ | | | |
| | CDCVM Data B1 b4b3 = 10 | | | | | ✓ | |
| | CDCVM Data B1 b4b3 = 11 | | | | | | ✓ |
| CDCVM Codebook = 0 | | ✓ | | | | | |
| CDCVM Codebook = 1 | | | ✓ | | | | |
| CDCVM Codebook = 2 | | | | | | ✓ | |
| CDCVM Codebook = 3 | | | | | | | ✓ |

TABLE 10-continued

Type of CDCVM

| Information in transaction data | Type of CDCVM | | | | | |
|---|---|---|---|---|---|---|
| | 0 | 1 | 2 | 3 | 4 | 5 |
| CDCVM Codebook = 4 | | | | ✓ | | |
| CDCVM Codebook = 5 | | | | | ✓ | |
| CDCVM Codebook = 6 | | | | | | ✓ |
| CDCVM Codebook = 7 | | | | ✓ | | |
| CDCVM Codebook = 8 | | | | ✓ | | |
| CDCVM Codebook = 9 | | | | | | ✓ |

Subfield 7-TUI Information

This subfield is relevant both to EMV and Mag Stripe approaches, but only limited information may be provided in the Mag Stripe approach. There are six possible values.

0—No CDCVM

1—CDCVM but no use of TUI

2—CDCVM but no use of TUI (TUI is supported by the environment)

3—CDCVM but no use of TUI (TUI is not supported by the environment)

4—CDCVM with unknown use of TUI

5—CDCVM with TUI

Table 11 below is a translation table for TUI Information 5

TABLE 11

TUI Information

| Information in transaction data | | TUI Information | | | | | |
|---|---|---|---|---|---|---|---|
| | | 0 | 1 | 2 | 3 | 4 | 5 |
| CDCVM Data B2 b4-b1 = 0000 | | ✓ | | | | | |
| CDCVM Data B2 b4-b1 ≠ 0000 | CDCVM Data B1 b8b7 = 00 | | | | | ✓ | |
| | CDCVM Data B1 b8b7 = 01 | | | | ✓ | | |
| | CDCVM Data B1 b8b7 = 10 | | | ✓ | | | |
| | CDCVM Data B1 b8b7 = 11 | | | | | | ✓ |
| CDCVM Codebook = 0 | | ✓ | | | | | |
| CDCVM Codebook = 1 | | | | | | | ✓ |
| CDCVM Codebook = 2 | | | | ✓ | | | |
| CDCVM Codebook = 3 | | | | ✓ | | | |
| CDCVM Codebook = 4 | | | | ✓ | | | |
| CDCVM Codebook = 5 | | | | ✓ | | | |
| CDCVM Codebook = 6 | | | | ✓ | | | |
| CDCVM Codebook = 7 | | | | | | ✓ | |
| CDCVM Codebook = 8 | | | | | | ✓ | |
| CDCVM Codebook = 9 | | | | | | | ✓ |

Subfield 8—Rating of CDCVM Method

This subfield may not be provided in the Mag Stripe approach. There are six possible values.

0—No CDCVM

1—No rating defined

2—No rating provided in the transaction data

3—Weak

4—Medium

5—High

Table 12 below is a translation table for Rating of CDCVM Method

TABLE 12

Rating of CDCVM Method

| Information in transaction data | | Rating of CDCVM Method | | | | | |
|---|---|---|---|---|---|---|---|
| | | 0 | 1 | 2 | 3 | 4 | 5 |
| CDCVM Data B2 b4-b1 = 0000 | | ✓ | | | | | |
| CDCVM Data B2 b4-b1 ≠ 0000 | CDCVM Data B1 b6b5 = 00 | | ✓ | | | | |
| | CDCVM Data B1 b6b5 = 01 | | | | ✓ | | |
| | CDCVM Data B1 b6b5 = 10 | | | | | ✓ | |
| | CDCVM Data B1 b6b5 = 11 | | | | | | ✓ |
| CDCVM Codebook = 0 | | | ✓ | | | | |
| CDCVM Codebook = 1 | | | ✓ | | | | |
| CDCVM Codebook = 2 | | | ✓ | | | | |
| CDCVM Codebook = 3 | | | ✓ | | | | |
| CDCVM Codebook = 4 | | | ✓ | | | | |
| CDCVM Codebook = 5 | | | ✓ | | | | |
| CDCVM Codebook = 6 | | | ✓ | | | | |
| CDCVM Codebook = 7 | | | ✓ | | | | |
| CDCVM Codebook = 8 | | | ✓ | | | | |
| CDCVM Codebook = 9 | | | ✓ | | | | |

Subfield 9—Rating of the Control on Prolonged/Persistent CDCVM

This subfield may not be provided in the Mag Stripe approach. There are seven possible values.

0—No CDCVM

1—Not applicable

2—No rating defined

3—No rating provided in the transaction data

4—Weak

5—Medium

6—High

Table 13 below is a translation table for Rating of the control on Prolonged/Persistent CDCVM

TABLE 13

Rating of the control on Prolonged/Persistent CDCVM

| Information in transaction data | | Rating of CDCVM Method | | | | | | |
|---|---|---|---|---|---|---|---|---|
| | | 0 | 1 | 2 | 3 | 4 | 5 | 6 |
| CDCVM Data B2 b4-b1 = 0000 | | ✓ | | | | | | |
| CDCVM Data B2 b4-b1 ≠ 0000 AND (CDCVM Data B1 b4b3 = 00 OR CDCVM Data B1 b4b3 = 11) | | | ✓ | | | | | |
| CDCVM Data B2 b4-b1 ≠ 0000 AND (CDCVM Data B1 b4b3 = 01 OR CDCVM Data B1 b4b3 = 10) | CDCVM Data B1 b2b1 = 00 | | | | ✓ | | | |
| | CDCVM Data B1 b2b1 = 01 | | | | | ✓ | | |
| | CDCVM Data B1 b2b1 = 10 | | | | | | ✓ | |
| | CDCVM Data B1 b2b1 = 11 | | | | | | | ✓ |
| CDCVM Codebook = 0 | | ✓ | | | | | | |
| CDCVM Codebook = 1 | | | | | ✓ | | | |
| CDCVM Codebook = 2 | | | | | ✓ | | | |
| CDCVM Codebook = 3 | | | | | ✓ | | | |
| CDCVM Codebook = 4 | | | | | ✓ | | | |
| CDCVM Codebook = 5 | | | ✓ | | | | | |
| CDCVM Codebook = 6 | | | ✓ | | | | | |
| CDCVM Codebook = 7 | | | | | | ✓ | | |
| CDCVM Codebook = 8 | | | | | | ✓ | | |
| CDCVM Codebook = 9 | | | ✓ | | | | | |

Subfield 10—Capture of CDCVM and Consent

This subfield may not be provided in the Mag Stripe approach. There are three possible values.

0—Capture of CDCVM and Consent performed on different devices

1—Not included in transaction data

2—Capture of CDCVM and Consent performed on the same device

Table 14 below is a translation table for Capture of CDCVM and Consent

TABLE 14

Capture of CDCVM and Consent

| Information in transaction data | Rating of CDCVM Method | | |
|---|---|---|---|
| | 0 | 1 | 2 |
| CDCVM Data B2 b5 = 0 | ✓ | | |
| CDCVM Data B2 b5 = 1 | | | ✓ |
| CDCVM Codebook = 0 | | ✓ | |
| CDCVM Codebook = 1 | | ✓ | |
| CDCVM Codebook = 2 | | ✓ | |
| CDCVM Codebook = 3 | | ✓ | |
| CDCVM Codebook = 4 | | ✓ | |
| CDCVM Codebook = 5 | | ✓ | |
| CDCVM Codebook = 6 | | ✓ | |
| CDCVM Codebook = 7 | | ✓ | |
| CDCVM Codebook = 8 | | ✓ | |
| CDCVM Codebook = 9 | | ✓ | |

Adaptation of existing Mag Stripe implementation to deliver the additional information in the CDCVM Codebook will now be described with reference to FIGS. 5 to 9. There is no corresponding discussion required for an EMV solution, as the approach used for delivering information to the issuer is essentially identical to existing approaches, requiring only the addition of additional subfield data in a field which has capacity for expansion.

Mag Stripe data is encoded according to a bitmap. The PAN (Primary Account Number) may be extended from a conventional 16 digit PAN up to 19 digits allow additional information to be conveyed through the Mag Stripe Model. Management of track data is described below so as to minimise impact on the authorization system while using one common model to deliver the Application Transaction Counter (ATC) of 2 digits, the cryptogram (CVC3) of 3 digits, the Unpredictable Number (UN) of three digits, and the 1 digit nUN value (all these terms are described further in EMV specifications referenced above).

The general principles of bitmap management according to this embodiment are as follows:
Track 1 is managed using one single model for any PAN length (16, 17, 18 or 19).
Bitmap Track 1 is 0000000F0000 for PCVC3 and 00000010F000 for PUNATC.
Track 2 is adjusted based on PAN length in order to carry the service code (SVC) and PSN (value is not carried when using 19-digit PAN with a default value set to 0).
Bitmap Track 2 is 00F0 for PCVC3 and 020E for PUNATC.
The nUN value is always set to 3.
The following information is carried:
AA ($A_2A_1$) where $A_2A_1$ is the value of the application transaction counter (ATC)
CCCC ($BC_3C_2C_1$) where B is the value from the codebook and $C_3C_2C_1$ is the value of the CVC3 (that is the cryptogram)
UUU ($U_3U_2U_1$) where $U_3U_2U_1$ is the value of the unpredictable number (UN)

Full bitmaps are not shown here, but may be derived as needed by the person skilled in the art using these principles. The five steps required to support an end-to-end contactless Mag Stripe transaction flow using a cloud-based payment system using a single cryptogram (AES) are shown below with reference to FIGS. 5 to 9. The functional elements in the system are the Mobile Payment Application (a component of a Wallet on a payment device), the POS terminal (POS) and the transaction management system (TMS).

FIG. 5 describes the generation of the cryptogram using an appropriate session key (here SK_CL_MCBP). The Initialization Vector (IV), Unpredictable Number (UN) and Application Transaction Counter (ATC) are all provided as inputs, with the CDCVM Codebook value providing an additional input (B). The PINIV value is used when User Authentication is completed, with IV used otherwise. Note the use of hex to decimal conversion as needed for the ATC counter and for the cryptogram.

FIG. 6 shows the process used by the Mobile Payment Application to convert the information to be carried using the CVC3 and the ATC as container. The same value is delivered by the MPA for the CVC3 container defined for Track 1 and the CVC3 container defined for Track 2.

FIG. 7 shows the process used by the Point of Sale (POS) terminal to integrate into the Track Data the UN and the values provided by MPA (CVC3, ATC).

FIG. 8 shows the process used by the Transaction Management System to extract the data carried using the Track Data.

FIG. 9 shows the process used by the Transaction Management System to validate the single cryptogram generated by the Mobile Payment Application. The B (codebook) information may be used to define the type of IV to be used for the cryptogram validation.

Many modifications may be made to the above examples without departing from the scope of the present disclosure.

The invention claimed is:

1. A method for providing user authentication and user consent for a contactless transaction made with a mobile payment device, comprising:
providing on the mobile payment device a digital wallet module, comprising:
a communication module;
a wallet processor;
a consent risk manager module; and
a payment application module;
wherein the consent risk manager module is electronically coupled to the wallet processor and wherein the consent risk manager module further includes a decision module on the payment device, wherein the consent risk manager module provides authentication based on a consumer device cardholder verification method (CDCVM);
a user authentication step, executed by the consent risk manager module, to verify that a user is entitled to use the payment device for a specific transaction;
an implicit user consent step, determined by a decision module of the consent risk manager module, to verify that the user implicitly consents to the specific transaction, wherein:
implicit consent is based on contextual information that is not directly related to providing explicit consent to the specific transaction, bypassing the need for any additional user action to indicate explicit consent,
the user authentication step is discrete from the user consent step,
the implicit user consent step is based on an order of events, and
the events comprise correlating at least a plurality of user actions and behavioral information, transaction context information, payment device information, terminal data, environmental information and proprietary check data;

outputting, from the decision module to the payment application module, implicit consent data indicating that implicit consent for the specific transaction has been determined based on an analysis of the events;

combining as CDCVM data the implicit consent data and authentication data associated with the CDCVM; and communicating, via the communication module and using an EMV data structure, the combined implicit consent data and CDCVM authentication data to an Issuer of an account associated with the mobile payment device.

2. The method of claim 1, wherein the user authentication step is taken outside a transaction context, but persists into a transaction context.

3. The method of claim 1, wherein the user consent step is an explicit user consent made within a transaction process.

4. The method of claim 1, wherein the user consent is an implicit user consent inferred from user or device actions or user or device context.

5. The method of claim 1, wherein results of the user authentication step and the user consent step are provided within a transaction.

6. The method of claim 5, wherein the results of the user consent step comprise a type of consent.

7. The method of claim 5, wherein the results of the user consent step comprise a rating of the user consent step.

8. The method of claim 5, wherein the results of the user authentication step comprise a type of user authentication used.

9. The method of claim 5, wherein the results of the user consent step comprise a rating of the user authentication step.

10. The method of claim 5, wherein the results of the user authentication step and the user consent step are transmitted as magnetic stripe track data.

11. The method of claim 10, further comprising encoding the results of the user authentication step and the user consent step into a coded value before transmission in the transaction.

12. A mobile payment device comprising a digital wallet module, the digital wallet module comprising: a wallet processor electronically coupled to a consent risk manager module and a payment application module, and a communication module, wherein the consent risk manager module further includes a decision module on the payment device, wherein the consent risk manager module provides authentication based on a consumer device cardholder verification method (CDCVM), the digital wallet module programmed to perform the following steps to provide user authentication and user consent for a contactless transaction made with the mobile payment device, the steps comprising:

a user authentication step, executed by the consent risk manager module to verify that a user is entitled to use the payment device for a specific transaction and;

an implicit user consent step, determined by a decision module of the consent risk manager module, to verify that the user implicitly consents to the specific transaction, wherein:

implicit consent is based on contextual information that is not directly related to providing explicit consent to the specific transaction, bypassing the need for any additional user action to indicate explicit consent, the user authentication step is discrete from the user consent step, the implicit user consent step is based on an order of events, and the events comprise correlating at least a plurality of user actions and behavioral information, transaction context information, payment device information, terminal data, environmental information and proprietary check data;

an output from the decision module to the payment application module, implicit consent data indicating that implicit consent for the specific transaction has been determined based on an analysis of the events;

a combination of the implicit consent data and authentication data associated with the CDCVM as CDCVM data; and communication, via the communication module and using an EMV data structure, the combined implicit consent data and CDCVM authentication data to an Issuer of an account associated with the mobile payment device.

13. The payment device of claim 12, wherein the payment device is adapted to provide results of the user authentication step and the user consent step within a transaction.

* * * * *